(12) United States Patent
Carlson et al.

(10) Patent No.: US 8,484,569 B2
(45) Date of Patent: Jul. 9, 2013

(54) SAVING AND RESTORING COLLABORATIVE APPLICATIONS IN CONTEXT

(75) Inventors: Michael P. Carlson, Austin, TX (US); Indran Naick, Cedar Park, TX (US); Theodore J. Shrader, Austin, TX (US); Clifford J. Spinac, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 249 days.

(21) Appl. No.: 12/827,728

(22) Filed: Jun. 30, 2010

(65) Prior Publication Data

US 2012/0005596 A1    Jan. 5, 2012

(51) Int. Cl.
G06F 3/00 (2006.01)
G06F 3/048 (2006.01)
G06F 11/00 (2006.01)

(52) U.S. Cl.
USPC ........... 715/751; 715/781; 715/784; 715/854; 714/15

(58) Field of Classification Search
USPC ............... 715/751, 854, 781, 784; 714/15
See application file for complete search history.

(56) References Cited

U.S. PATENT DOCUMENTS

| 7,296,021 | B2* | 11/2007 | Malkin et al. .................. 1/1 |
| 7,574,591 | B2 | 8/2009 | Downer et al. |
| 2004/0066414 | A1* | 4/2004 | Czerwinski et al. .......... 345/781 |
| 2004/0088331 | A1* | 5/2004 | Therrien et al. .............. 707/200 |
| 2004/0153973 | A1 | 8/2004 | Horwitz |
| 2006/0156246 | A1* | 7/2006 | Williams et al. .............. 715/764 |
| 2007/0179646 | A1 | 8/2007 | Dempski et al. |
| 2008/0034327 | A1* | 2/2008 | Cisler et al. ................... 715/854 |
| 2008/0163258 | A1 | 7/2008 | Balasubramanian |
| 2008/0243959 | A1* | 10/2008 | Bacastow et al. ............. 707/204 |
| 2009/0083665 | A1 | 3/2009 | Anttila et al. |
| 2009/0300552 | A1 | 12/2009 | Bollman et al. |
| 2009/0327953 | A1 | 12/2009 | Honkala et al. |
| 2009/0327973 | A1 | 12/2009 | Lee et al. |
| 2010/0017695 | A1 | 1/2010 | Palmieri |
| 2010/0017756 | A1 | 1/2010 | Wassom, Jr. et al. |
| 2010/0023738 | A1 | 1/2010 | Sheehan et al. |
| 2010/0094859 | A1* | 4/2010 | Gupta .......................... 707/709 |

OTHER PUBLICATIONS

Vartiainen, Elina, et al., "Graphical History List with Multi-Window Support on a Mobile Web Browser", The Third International Conference on Internet and Web Applications and Services, pp. 121-129 (2008).

(Continued)

Primary Examiner — Doug Hutton, Jr.
Assistant Examiner — Li Sun
(74) Attorney, Agent, or Firm — Charles L. Moore; Moore & Van Allen PLLC

(57) ABSTRACT

A method for saving and restoring collaborative applications to a selected earlier time, may include saving, by a processing device, content for each collaborative application of a plurality of collaborative applications as a user uses each of the collaborative applications. The method may additionally include restoring each collaborative application to a selected earlier time in response to the selected earlier time being selected by the user. The method may further include presenting the content of each collaborative application at the selected earlier time to the user in response to each collaborative application being restored to the selected earlier time, wherein each collaborative application is presented in an original context from the selected earlier time.

19 Claims, 6 Drawing Sheets

OTHER PUBLICATIONS

Heer, Jeffrey, et al., "Graphical Histories for Visualization: Supporting Analysis, Communication, and Evaluation", IEEE Transactions and Computer Graphics, vol. 14, No. 6, pp. 1189-1196 (Nov./Dec. 2008).

Derthick, Mark, et al., Enhancing Data Exploration with a Branching History of User Operations, Human Computer International Institute, Carnegie Mellon University, Pittsburg, PA, pp. 1-24, Mar. 2001.

Edwards, et al., A Temporal Model for Multi-Level Undo and Redo. Proceedings of the Thirteenth ACM Symposium on User Interface Software and Technology (UIST), 10 pgs., Nov. 5-8, 2000.

www.support.microsoft.com, How to restore Windows XP to a previous state, Article ID: 306084—Last Review: 4 pgs., Nov. 6, 2008—Revision: 4.3.

* cited by examiner

SAVING AND RESTORING COLLABORATIVE APPLICATIONS IN CONTEXT

BACKGROUND

Aspects of the present invention relate to restoring collaborative applications to a previous time period, and more particularly to a method, system and computer program product for saving and restoring collaborative applications in context to a selected earlier time.

Computer users today typically have multiple computer tools or applications running simultaneously. Several of these tools or applications may have the capability of collaborating or working cooperatively with one another. For example e-mail, instant messaging, documents, presentations shared spaces, computer application Integration Development Environment (IDE) and other applications may be used in conjunction with one another or collaboratively.

Computer users often communicate with colleagues using more then one application. The content of one application may influence what is described in another application or collaborative application. For example a user may be instant messaging a colleague on a particular topic and may create a note which is based on the information shared in the chat session in another collaborative application. Each of these applications may allow the user to review past information but only separately, i.e., either the chat history or the note. However in a collaborative environment, the entire context may be much more valuable or meaningful than the individual pieces.

BRIEF SUMMARY

According to one aspect of the present invention, a method for saving and restoring collaborative applications to a selected earlier time, may include saving, by a processing device, content for each collaborative application of a plurality of collaborative applications as a user uses each of the collaborative applications. The method may also include restoring, by the processing device, each collaborative application to a selected earlier time in response to the selected earlier time being selected by the user. The method may further include presenting, by the processing device, the content of each collaborative application at the selected earlier time to the user in response to each collaborative application being restored to the selected earlier time. Each collaborative application may be presented in an original context from the selected earlier time.

According to another aspect of the present invention, a system for saving and restoring collaborative applications to a selected earlier time may include a processor. A module operating on the processor may be adapted for saving content of each collaborative application and restoring the content of each collaborative application to a selected earlier time. The module may include a module to save the content for each collaborative application of a plurality of applications as a user uses each of the collaborative applications. The module for saving and restoring content of each collaborative application may also include another module to restore the content of each collaborative application to the selected earlier time in response to the selected earlier time being selected by the user. The module for saving and restoring content of each collaborative application may include an additional module to present the restored content of each collaborative application at the selected earlier time on a display to the user in response to each collaborative application being restored to the selected time. Each collaborative application may be presented in an original context at the selected earlier time.

According to a further aspect of the present invention, a computer program product for saving and restoring collaborative applications to a selected earlier time may include a computer readable storage medium having computer readable program code embodied therewith. The computer readable program code may include computer readable program code configured to save content for each collaborative application of a plurality of collaborative applications as a user uses each of the collaborative applications. The computer readable program code may also include computer readable program code configured to restore each collaborative application to a selected earlier time in response to the selected earlier time being selected by the user. The computer readable program code may additionally include computer readable program code configured to present the content of each collaborative application at the selected earlier time to the user in response to each collaborative application being restored to the selected earlier time. Each collaborative application may be presented in an original context from the selected earlier time.

BRIEF DESCRIPTION OF THE SEVERAL VIEWS OF THE DRAWINGS

The present invention is further described in the detailed description which follows in reference to the noted plurality of drawings by way of non-limiting examples of embodiments of the present invention in which like reference numerals represent similar parts throughout the several views of the drawings and wherein.

DETAILED DESCRIPTION

Figure 1:
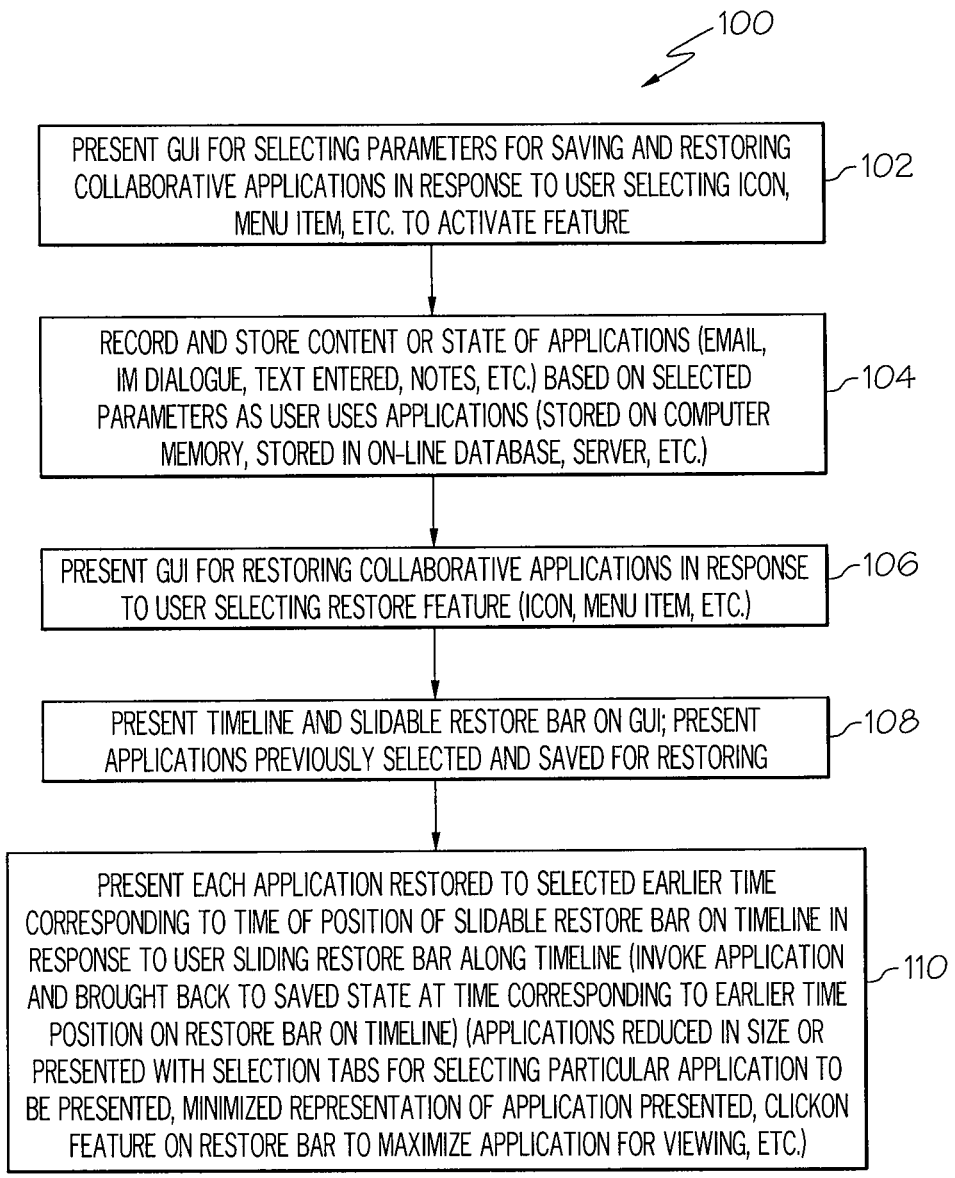
FIG. 1 is a flowchart of an example of a method for saving and restoring collaborative applications in context to a selected earlier time in accordance with an embodiment of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 is a flowchart of an example of a method 100 for saving and restoring collaborative applications in context to a selected earlier time in accordance with an embodiment of the present invention. A user is able to track, capture or store the state of all tools or applications and when desired to return to a view of all the states or content of the applications or tools at a selected point earlier in time. Tracking, capturing or storing the state or content of applications can typically be easily implemented. If such a feature does not already exist, a background backup facility or module may be incorporated in each application. Such features already exist in many applications. This may be the case in applications from the same vendor, and particularly if the applications are collaborative applications and may be used in conjunction or cooperatively with one another similar to that previously described. An application programming interface (API) may call the application with a time/date parameter and have the application display its state or content at the selected earlier point in time. As described herein a mechanism or GUI may permit the user to interact with the application. A standardized API available across all applications could be used to implement the features described herein.

In block 102, a graphical user interface (GUI) may be presented for selecting parameters for saving and restoring applications. The GUI may be presented in response to a user selecting an icon, menu item of the like to activate the saving and restoring of application feature. The applications being saved for possible future restoration as described herein may be collaborative applications. Collaborative applications may be defined as applications or computer tools that may compliment one another or that may be used in conjunction with one another. Examples may include but are not limited to email, instant messaging (IM), notes that may be taken in another application related to emails and/or IM dialogues, documents, presentations, computer application Integration Development Environment (IDE), and similar applications or tools. Collaborative applications may be used by multiple users and as such may define a collaborative environment. Collaborative may be defined in one context as a recursive process where two or more people or organizations may work together in an intersection of common goals. Such collaboration may result in a final goal of something produced by a computer application, such as a note, presentation, computer application, etc.

Figure 2:
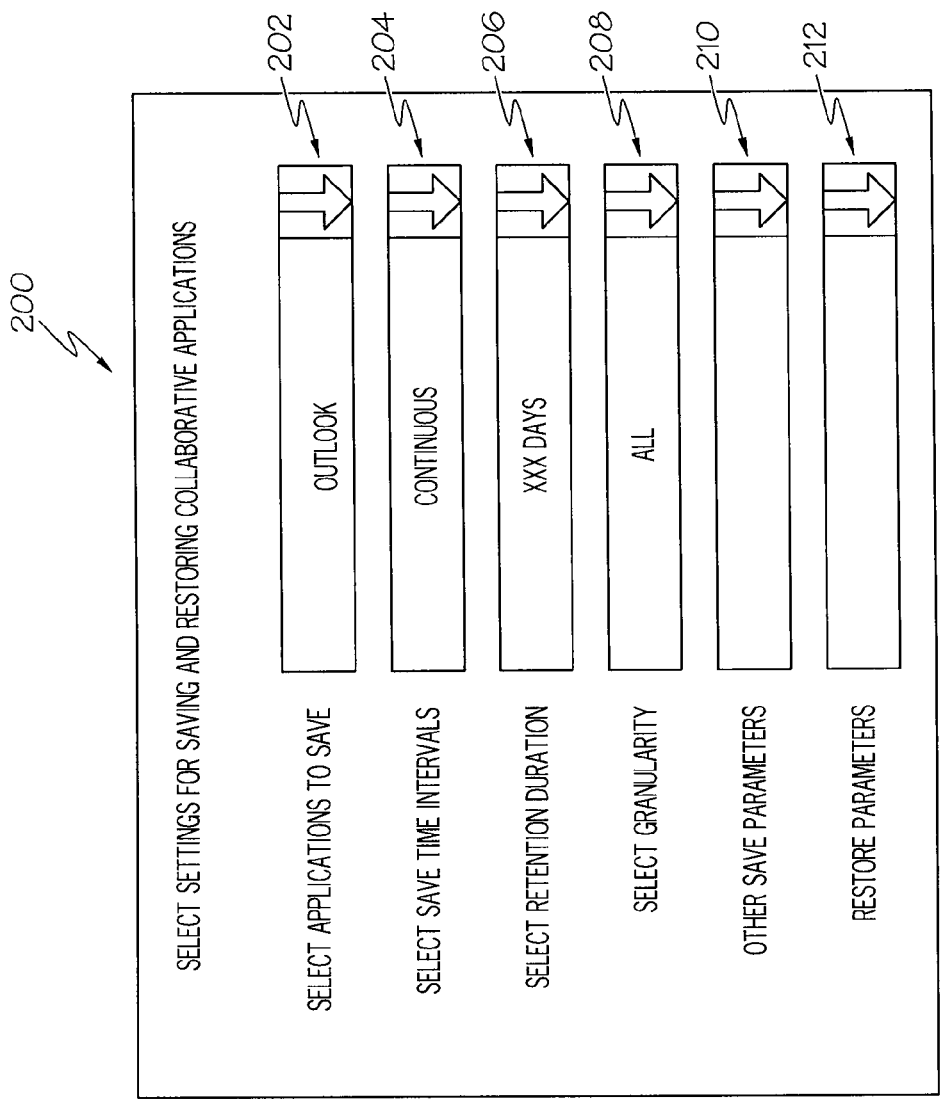
FIG. 2 is an example of a graphical user interface for selecting settings or parameters for saving and restoring collaborative applications in context to a selected earlier time in accordance with an embodiment of the present invention.

Referring also to FIG. 2, FIG. 2 is an example of a GUI 200 for selecting settings or parameters for saving and restoring collaborative applications to a selected earlier time in accordance with an embodiment of the present invention. The GUI 200 may include a feature 202, such as a menu, dropdown list or similar feature for selecting or choosing applications that may be tracked or recorded and saved for restoration in the future to a selected earlier time as described herein.

The GUI 200 may also include a feature 204 for selecting a time interval between different saving or capturing procedures or occurrences. The state or content of the application may be continuously tracked, recorded and saved or the state or content may be saved at selected time intervals to save processing overhead and file storage capacity, if appropriate or needed under the circumstances.

The GUI 200 may additionally include a feature 206 for selecting or choosing a retention duration or time period or number of days a saved state or content of an application is stored. The retention duration may be set to overwrite the earliest saved state when the allotted memory space or storage facility becomes full.

The GUI 200 may further include a feature 208 for selecting the granularity or amount of detail of the state or content of the applications to be recorded or captured and saved. All details of the state of the application may be saved or only selected features, such as for example only text.

The GUI 200 may also include other features, such as feature 210 for selecting other parameters related to saving the state or content of the application, and feature 212 for selecting parameters related to restoring the state or content of each of the applications at a selected earlier time.

Returning to FIG. 1, in block 104, the content or state of each chosen application or collaborative application may be recorded or tracked and stored as the user uses the collaborative applications in their normal way. The content or state of each application may be recorded, tracked and stored based on selected parameters as previously described. The state or content of each collaborative application may be stored on the user's computer memory, on an on-line database, on a server or other storage device or facility that may be associated with the user's computer system or may be online and accessible over a network as described herein.

A continuous, cross application state with collaboration text of each collaborative application may be saved. For example, a user may be viewing a document in a word processing application with a team of others and using a chat session to keep notes. A record of the time when comments are entered into the chat and the state of the word processing document may be recorded or saved, i.e., the page that is being viewed, the snapshot of the content, the state of comments or highlights added to the document, etc. may be saved or recorded. This set of recorded snapshots of collaboration context may be stored in such a way that the user may view what occurred in the context of the collaboration when restored to this earlier time at a later time. To answer a question such as, why was paragraph 2 added to page 5 of the document, the user can scroll back using a mechanism, such as a slide bar on a timeline as described herein, or other mechanism to scroll back through the collaboration context recording. When the user reaches the section that shows page 5 of the document being edited, the user can also view the contents of the chat session at that selected point in time. That chat may potentially help the user to understand why the paragraph was added.

In block 106, a GUI may be presented for restoring the applications in response to the user selecting a restore feature. The restore feature may be an icon, menu item or other mechanism for activating the restore function.

In block 108, a mechanism may be presented to the user for restoring each application to a selected earlier time. The mechanism may permit selection over a continuum of time over which each of the chosen collaborative applications has been saved. For example, the mechanism may be a timeline or similar arrangement. The timeline may be presented along with a moveable or slidable restore bar that may be slid along the timeline for selecting an earlier time to which the collaborative applications may be restored. Each collaborative application may be restored to the selected earlier time selected by the user to thereby result in the collaborative environment's context at that selected earlier time. Examples of a timeline and slidable restore bar will be described in more detail with reference to FIGS. 3A and 3B, and FIG. 4.

In block 110, each application restored to a selected earlier time may be presented to the user. Each application may be restored to the state or content of the application at the selected earlier time corresponding to the time of the position of the slidable restore bar on the timeline selected by the user. The user may also operate a button or other feature that may be labeled "Restore" or similar label identifying the features function in order for the method 100 or system to restore the applications to the selected earlier time and to present the content or state of each application to the user on a computer display or other output device.

The chosen collaborative applications may be simultaneously invoked and brought back to the save state at the time corresponding to the selected earlier time position of the restore bar on the timeline.

The restored applications may be at a reduced size or minimized condition in order to permit a representation of all restored chosen applications on the display or other device. As described in more detail herein, the restore bar or other feature may include a mechanism to permit selection of an application for the selected application to be maximized or expanded in size for viewing. The restore bar feature or other feature may be clicked-on or otherwise operated to minimize the selected application to permit another application to be maximized or the maximized application may be automatically minimized in response to another restored application being maximized. As described in more detail herein, the restore bar may also include a feature or an indication of the number of applications that may be restorable and/or that have been restored to the selected earlier time.

In another embodiment, selection tabs may be provided for selecting a particular application or applications for viewing when all restored applications are not able to be effectively presented on the display or other device.

Figure 3A:
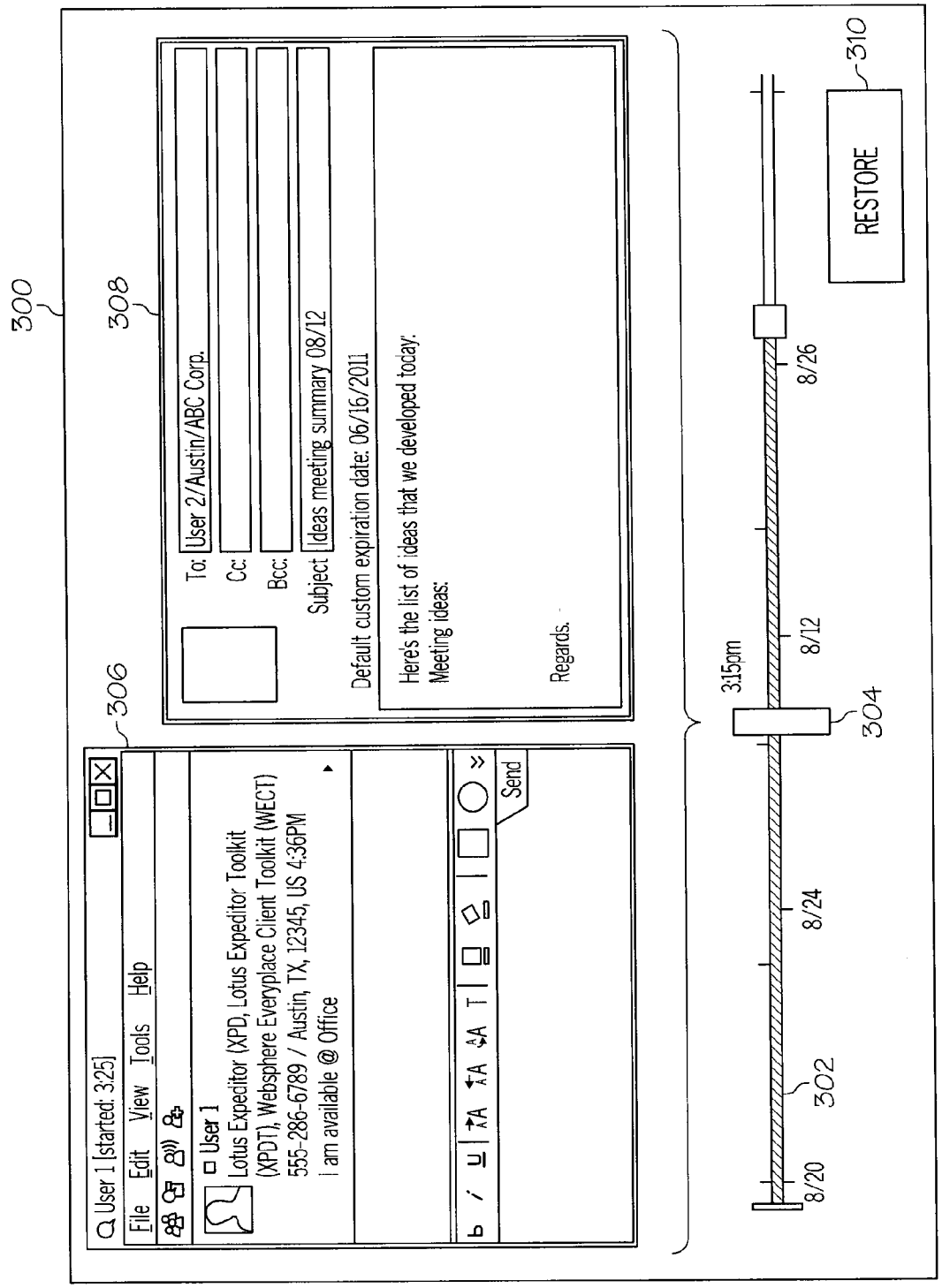
FIGS. 3A and 3B are each an example of a graphical user interface illustrating restoring collaborative applications in context to a selected earlier time in accordance with an embodiment of the present invention.
Figure 3B:
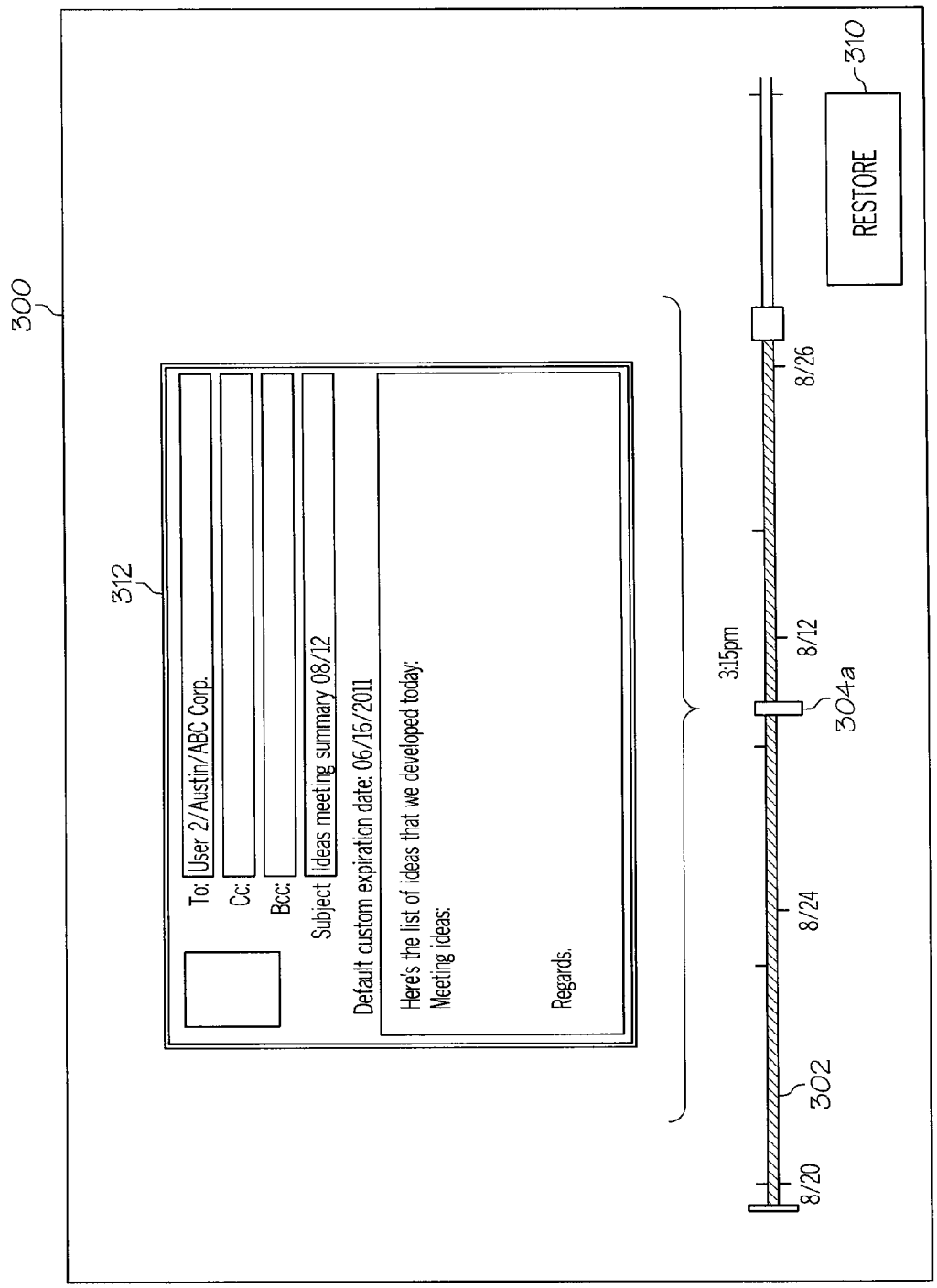

FIGS. 3A and 3B are each an example of a GUI 300 illustrating restoring collaborative applications to a selected earlier time in accordance with an embodiment of the present invention. The GUI 300 may include a timeline 302 and a slidable restore bar 304. The restore bar 304 is slidable along the timeline 302 using a computer pointing device or similar device for positioning the restore bar 304 at a selected earlier time for restoring the applications to their state including content at the earlier time. The collaborative applications 306 and 308 may then be restored and presented in the GUI 300. The GUI 300 may include a restore button 310 or other feature that may be operated after the restore bar 302 is positioned to the selected earlier time to which the applications 306 and 308 are to be restored. In another embodiment, the restore bar 304 may be clicked-on or operated to start the process of restoring the applications 306 and 308 to the selected earlier time on the timeline 302. Accordingly, the applications 306 and 308 may be restored to the same selected earlier time and presented in context to the user including their respective states and content as they appeared at the earlier time.

The GUI 300 may also include an indication of the number of applications that may be stored or have been restored or both. In one embodiment, the indication of the number of applications may include a size of the slidable restore bar 304. For example, the restore bar 304 may have a width sized to correspond to the number of collaborative applications 306 and 308. As illustrated in FIG. 3A, the restore bar 304 has a predetermined width corresponding to the two restored applications 306 and 308 and the restore bar 304a in FIG. 3B has another predetermined narrower width corresponding to the one restored application 312. If there were more than two restorable or restored applications, the restore bar 304 may been wider than that illustrated in FIG. 3A.

Figure 4:
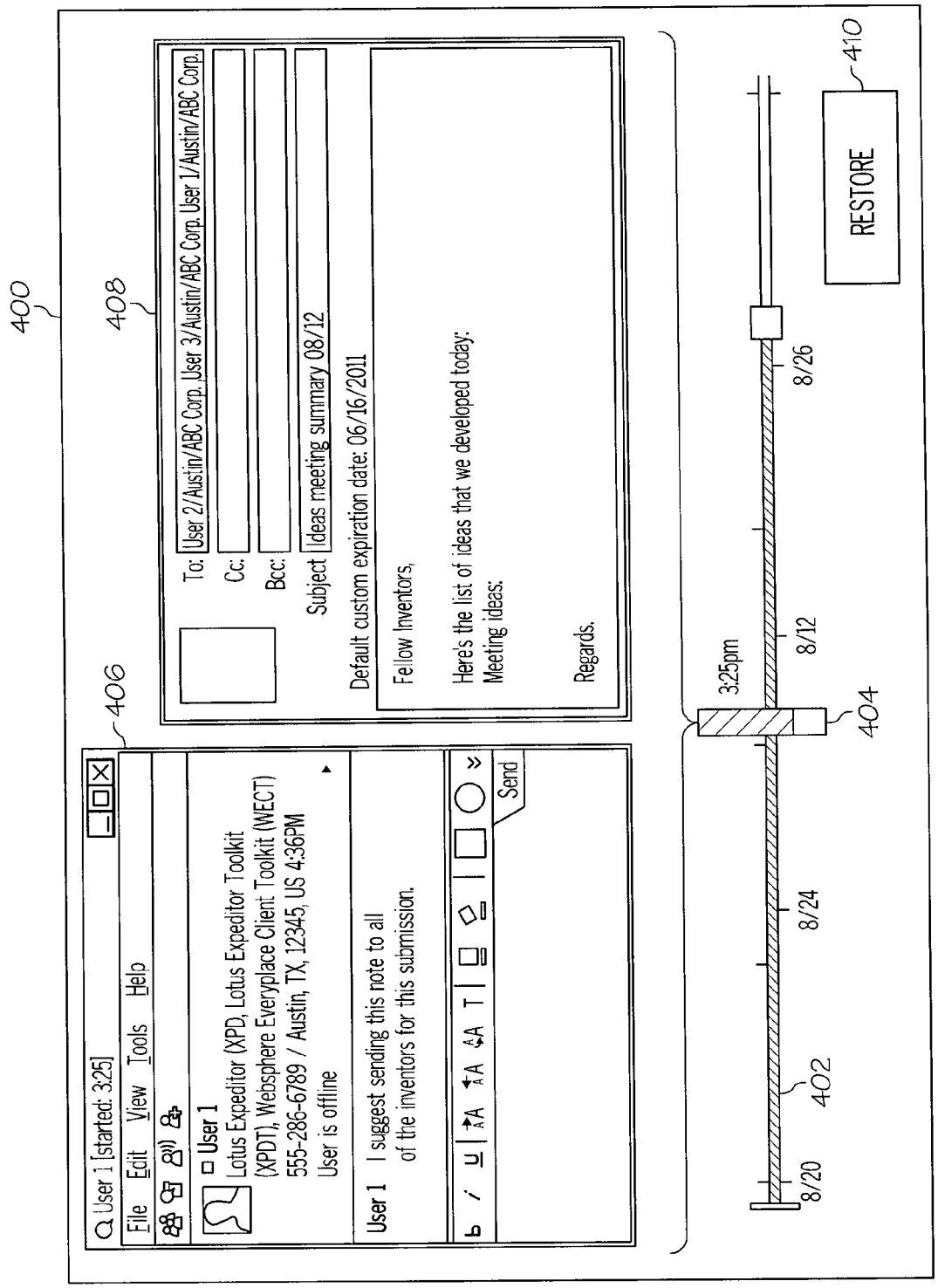
FIG. 4 is an example of a graphical user interface illustrating restoring collaborative applications in context to a selected earlier time in accordance with another embodiment of the present invention.

FIG. 4 is an example of a GUI 400 illustrating restoring selected collaborative applications to a selected earlier time in accordance with another embodiment of the present invention. The GUI 400 may include a timeline 402 similar to the timeline 302 in FIGS. 3A and 3B. The GUI 400 may also include a slidable restore bar 404 that is slidable along the timeline 402 to select an earlier time to which the collaborative applications 406 and 408 may be restored. The slidable restore bar 404 may be divided into a number of segments corresponding to the number of applications 406 and 408 that may be restored to the selected earlier time or that may have been restored to the selected earlier time or both. Each segment of the restore bar 404 may include a feature to identify the particular application 406 or 408 to which the segment corresponds. For example, each segment may be a different color to identify the particular application to which the segment corresponds. The particular application 406 or 408 may be alternately maximize or minimized for viewing in response to the segment corresponding to the particular application 406 or 408 being clicked-on or otherwise operated.

The GUI 400 may also include a button 410 that may be labeled "Restore" or the like. The "Restore" button 410 may be operated by the user after the restore bar 404 has been positioned to the desired or selected time to which the applications 406 and 408 are to be restored to start the process for restoring the applications 406 and 408 to the selected earlier time.

Figure 5:
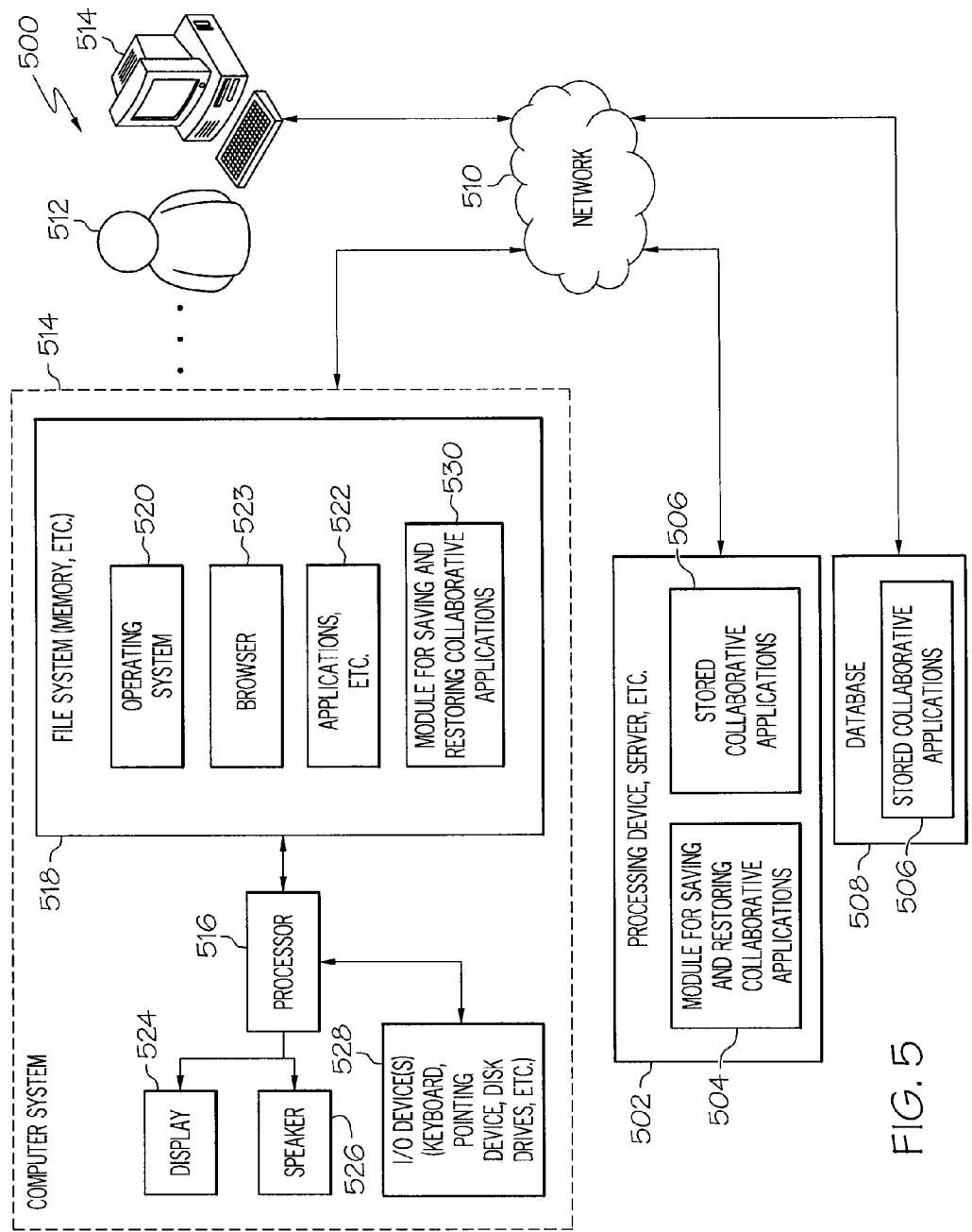
FIG. 5 is a block schematic diagram of an example of a system for saving and restoring collaborative applications in context to a selected earlier time in accordance with an embodiment of the present invention.

FIG. 5 is a block schematic diagram of an example of a system 500 for saving and restoring collaborative applications in context to a selected earlier time in accordance with an embodiment of the present invention. The method 100 of FIG. 1 may be embodied in or performed by the system 500. The GUIs illustrated in FIGS. 2, 3A, 3B and 4 may be generated and presented by the system 500. The system 500 may include a processing device 502. The processing device 502 may be a server or similar processing device. A module 504 for saving and restoring applications, that may be collaborative applications, to a selected earlier time may be stored on the processing device 502 and may be operable on the processing device 502 for saving and restoring collaborative applications or other applications or tools similar to that described herein. The module 504 may be stored on a file system of the processing device 502. Portions of or all of the method 100 may be embodied in or performed by the module 504.

The state or content of the collaborative applications similar that previously described may be recorded and saved in a storage device 506 on the processing device 502 or server. In another embodiment, the recorded applications 506 may be stored in a database 508 accessible online or via a network 510.

A user 512 of the saving and restoring applications feature may use a computer system 514 to access the processing device 502 or server and module 504 for saving and restoring applications. The computer system 514 may include a processor 516 to control operation of the computer system 514 and a file system 518, memory or similar data storage device.

An operating system 520, applications 522 and other programs may be stored on the file system 518 for running or operating on the processor 516. A web or Internet browser 523 may also be stored on the file system 518 for accessing the processing device 502 or server via the network 510 for saving and restoring applications or tools as described herein. The network 510 may be the Internet, an intranet or other private or proprietary network.

The computer system 514 may also include a display 524, a speaker system 526, and one or more input devices, output devices or combination input/output devices, collectively I/O devices 528. The I/O devices 528 may include a keyboard, pointing device, such as a mouse, disk drives and any other devices to permit a user, such as user 512, to interface with and control operation of the computer system 514 and to access the module 504 or system for saving and restoring applications. The display 524 may present the GUIs, such as the exemplary GUIs illustrated in FIGS. 2, 3A, 3B and 4 and other information related to the features described herein. The I/O device 528 may also present GUIs and other information.

In accordance with an embodiment, a module 530 for saving and restoring applications may be stored on the file system 518 of the computer system 514 and operable on the processor 516 to perform the operations described herein. The module 530 may be in lieu of the module 504 on the processing device 502 or the module 530 may perform some of the features and operations described herein and the module 504 may perform other features and operations described herein.

This saving and restoring features described herein are different from backup applications such as APPLE® TIME-MACHINE® in that the present invention is capable of tracking the state or content of multiple applications at the same time and then restoring their states simultaneously to save processing overhead and file storage capacity. Additionally, the present invention provides restoring multiple chosen collaborative applications to the selected earlier time as selected by the user, thereby resulting in the collaborative applications or collaborative environment's context at the earlier time being presentable. The view of the synchronization of the original context between the applications or collaborative applications is thus restored to the selected earlier time. In contrast, backup/recovery applications only serve to view a single application's state at a point in time. The present invention provides a significant difference in a collaborative environment, as each application provides content or context to the environment or conversation. APPLE® and APPLE TIMEMACHINE® are trademarks of Apple Computer, Inc. in the United States, other countries or both.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to embodiments of the invention in the form disclosed. Many modifications and variations will be apparent to those of ordinary skill in the art without departing from the scope and spirit of embodiments of the invention. The embodiment was chosen and described in order to best explain the principles of embodiments of the invention and the practical application, and to enable others of ordinary skill in the art to understand embodiments of the invention for various embodiments with various modifications as are suited to the particular use contemplated.

Although specific embodiments have been illustrated and described herein, those of ordinary skill in the art appreciate that any arrangement which is calculated to achieve the same purpose may be substituted for the specific embodiments shown and that embodiments of the invention have other applications in other environments. This application is intended to cover any adaptations or variations of the present invention. The following claims are in no way intended to limit the scope of embodiments of the invention to the specific embodiments described herein.

What is claimed is:

1. A method for saving and restoring collaborative applications to a selected earlier time, comprising:
    saving, by a processing device, content for each collaborative application of a plurality of collaborative applications as a user uses each of the collaborative applications;
    presenting, by the processing device, a timeline on a GUI on a display to the user, the timeline corresponding to a time duration over which the content of each of the collaborative applications has been saved, the timeline comprising a time scale including a plurality of time marks and a date indication associated with each time mark;
    presenting, by the processing device, a feature associated with the timeline for selecting a time on the timeline by the user, each of the collaborative applications being restorable to the selected time when selected on the timeline by the user, wherein presenting the feature for selecting the time on the timeline for restoring each of the collaborative applications to the selected time comprises presenting a slidable restore bar on the timeline, the restore bar being slidable along the timeline for positioning at the selected time by a computer pointing device, and wherein the slidable restore bar comprises a mechanism for restoring each collaborative application to the selected earlier time corresponding to a position of the slidable restore bar on the timeline in response to the slidable restore bar being clicked-on by the user;
    restoring, by the processing device, each collaborative application to a selected earlier time in response to the selected earlier time being selected by the user using the slidable restore bar and the slidable restore bar being clicked-on by the user; and
    presenting, by the processing device, the content of each collaborative application at the selected earlier time to the user in response to each collaborative application being restored to the selected earlier time, wherein each collaborative application is presented in an original context from the selected earlier time.

2. The method of claim 1, further comprising presenting an indication of a number of collaborative applications that are restored.

3. The method of claim 2, wherein presenting the indication of the number of collaborative applications comprises sizing a width of the slidable restore bar to correspond to the number of collaborative applications that are restored.

4. The method of claim 2, wherein presenting the indication of the number of collaborative applications comprises dividing the slidable restore bar into a number of segments corresponding to the number of collaborative applications that are restored to the selected time.

5. The method of claim 4, wherein each segment of the slidable restore bar corresponds to a different collaborative application, and wherein each segment comprises a feature to identify a particular application to which the segment corresponds.

6. The method of claim 5, wherein each segment of the slidable restore bar includes a different color to identify the particular application to which the segment corresponds.

7. The method of claim 5, further comprising alternately maximizing and minimizing the particular application by activating and deactivating the segment of the slidable restore bar that corresponds to the particular application.

8. The method of claim 1, further comprising presenting a mechanism to the user for restoring each collaborative application to a selected earlier time, the mechanism permitting selection over a continuum of time over which the content of each of the collaborative applications has been saved.

9. A system for saving and restoring collaborative applications to a selected earlier time comprising:
    a processor;
    a module, operating on the processor, for saving content of each collaborative application and restoring the content of each collaborative application to a selected earlier time, the module comprising:
        a module to save the content for each collaborative application of a plurality of collaborative applications as a user uses each of the collaborative applications;
        a module for presenting a timeline on a GUI on a display to the user, the timeline corresponding to a time duration over which the content of each of the collaborative applications has been saved, the timeline comprising a time scale including a plurality of time marks and a date indication associated with each time mark;
        a module for presenting a feature associated with the timeline for selecting a time on the timeline by the user, each of the collaborative applications being restorable to the selected time when selected on the timeline by the user, wherein the feature associated with the timeline for selecting a time on the timeline comprises a slidable restore bar on the timeline, the slidable restore bar being slidable along the timeline for positioning at the selected earlier time by a computer pointing device, and wherein the slidable restore bar comprises a mechanism for restoring each collaborative application to the selected earlier time corresponding to a position of the slidable restore bar on the timeline in response to the slidable restore bar being clicked-on by the user;

a module to restore each collaborative application to the selected earlier time in response to the selected earlier time being selected by the user using the slidable restore bar and the slidable restore bar being clicked-on by the user; and a module to present the restored content of each collaborative application at the selected earlier time on a display to the user in response to the selected earlier time being selected by the user and each collaborative application being restored to the selected earlier time, wherein each collaborative application is presented in an original context from the selected earlier time.

10. The system of claim 9, wherein the slidable restore bar comprises a width corresponding to a number of collaborative applications that are restorable.

11. The system of claim 9, the slidable restore bar comprises a number of segments corresponding to a number of collaborative applications that are restorable, wherein each segment of the slidable restore bar corresponds to a different collaborative application, and wherein each segment comprises a feature to identify a particular application to which the segment corresponds.

12. The system of claim 11, wherein each particular application is alternately maximized and minimized in response to a segment of the slidable restore bar corresponding to the particular application being alternately activated and deactivated by a computer pointing device.

13. A computer program product for saving and restoring collaborative applications to a selected earlier time, the computer program product comprising:

a non-transitory computer readable storage medium having computer readable program code embodied therewith, the computer readable program code comprising:

computer readable program code configured to save content for each collaborative application of a plurality of collaborative applications as a user uses each of the collaborative applications;

computer readable program code configured to present a timeline on a GUI on a display to the user, the timeline corresponding to a time duration over which the content of each of the collaborative applications has been saved, the timeline comprising a time scale including a plurality of time marks and a date indication associated with each time mark;

computer readable program code configured to present a feature associated with the timeline for selecting a time on the timeline by the user, each of the collaborative applications being restorable to the selected time when selected on the timeline by the user, wherein the feature associated with the timeline for selecting a time on the timeline comprises a slidable restore bar on the timeline, the slidable restore bar being slidable along the timeline for positioning at the selected earlier time by a computer pointing device, and wherein the slidable restore bar comprises a mechanism for restoring each collaborative application to the selected earlier time corresponding to a position of the slidable restore bar on the timeline in response to the slidable restore bar being clicked-on by the user;

computer readable program code configured to restore each collaborative application to a selected earlier time in response to the selected earlier time being selected by the user using the slidable restore bar and the slidable restore bar being clicked-on by the user; and computer readable program code configured to present the content of each collaborative application at the selected earlier time to the user in response to each collaborative application being restored to the selected earlier time, wherein each collaborative application is presented in an original context from the selected earlier time.

14. The computer program product of claim 13, wherein the computer readable program code further comprises computer readable program code configured to size a width of the slidable restore bar to correspond to a number of collaborative applications that are restored.

15. The computer program product of claim 13, wherein the computer readable program code further comprises:

computer readable program code configured to divide the slidable restore bar into a number of segments corresponding to the number of collaborative applications that are restored to the selected earlier time, wherein each segment of the slidable restore bar corresponds to a different collaborative application, and wherein each segment comprises a feature to identify a particular application to which the segment corresponds; and computer readable program code configured to alternately maximize and minimize the particular application in response to the user activating and deactivating the segment of the slidable restore bar that corresponds to the particular application.

16. The method of claim 1, further comprising presenting a time of day in association with the slidable restore bar.

17. The method of claim 1, further comprising presenting a GUI for selecting at least one setting for saving and restoring the collaborative applications.

18. The method of claim 17, wherein presenting the GUI for selecting the at least one setting for saving and restoring the collaborative applications comprises:

presenting a feature for selecting the collaborative applications to be recorded and saved;

presenting a feature for selecting a time interval for saving each collaborative application;

presenting a feature for selecting a time duration for retaining each saved collaborative application; and presenting a feature for selecting a granularity of content of each collaborative application to be recorded and saved.

19. The method of claim 1, wherein each of the collaborative applications are used by multiple users, each user on different computer system in a collaborative environment.

* * * * *